(12) United States Patent
Murata et al.

(10) Patent No.: US 9,279,916 B2
(45) Date of Patent: Mar. 8, 2016

(54) OPTICAL ELEMENT, IMAGING APPARATUS INCLUDING THE ELEMENT, AND METHOD OF MANUFACTURING THE OPTICAL ELEMENT

(71) Applicant: PANASONIC CORPORATION, Osaka (JP)

(72) Inventors: Jun Murata, Osaka (JP); Takamasa Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 49 days.

(21) Appl. No.: 14/259,968

(22) Filed: Apr. 23, 2014

(65) Prior Publication Data

US 2014/0254019 A1    Sep. 11, 2014

Related U.S. Application Data

(63) Continuation of application No. PCT/JP2013/002079, filed on Mar. 27, 2013.

(30) Foreign Application Priority Data

Apr. 4, 2012   (JP) .................................. 2012-085406

(51) Int. Cl.
*G02B 5/02* (2006.01)
*B29D 11/00* (2006.01)
(Continued)

(52) U.S. Cl.
CPC .......... *G02B 5/0215* (2013.01); *B29D 11/0074* (2013.01); *B29D 11/00346* (2013.01); *G02B 1/118* (2013.01); *G02B 3/00* (2013.01)

(58) Field of Classification Search
CPC .... G02B 5/0215; G02B 5/0231; G02B 1/118; B29D 11/00317–11/00346; B29D 11/0074
See application file for complete search history.

(56) References Cited

U.S. PATENT DOCUMENTS

2006/0215280 A1    9/2006   Hayashi et al.
2006/0220268 A1*  10/2006  Chao et al. ..................... 264/2.5
2007/0229942 A1*  10/2007  Horie et al. ................... 359/350
(Continued)

FOREIGN PATENT DOCUMENTS

JP    2004-318055 A    11/2004
JP    2006-053220 A     2/2006
(Continued)

OTHER PUBLICATIONS

International Search Report issued in International Application No. PCT/JP2013/002079 mailed Jun. 25, 2013, with English translation, 5 pgs.

*Primary Examiner* — Thomas K Pham
*Assistant Examiner* — Cara Rakowski
(74) *Attorney, Agent, or Firm* — McDermott Will & Emery LLP

(57) ABSTRACT

A lens is obtained by injection molding. The lens includes a plurality of projections arranged on a surface at a pitch smaller than or equal to a predetermined value to reduce reflection of light with a wavelength equal to or greater than the pitch, and a gate mark formed on an outer periphery of the optical element in the injection molding. A peripheral portion of the surface includes a first region whose circumferential position corresponds to the gate mark, and a second region being adjacent to the first region. Axes of first projections in the first region are inclined more outward than axes of second projections in the second region.

9 Claims, 11 Drawing Sheets

(51) Int. Cl.
*G02B 1/118* (2015.01)
*G02B 3/00* (2006.01)

(56) References Cited

U.S. PATENT DOCUMENTS

2011/0317234 A1* 12/2011 Ominato .............. G02B 26/125
359/206.1
2013/0148206 A1 6/2013 Tamura et al.

FOREIGN PATENT DOCUMENTS

| | | |
|---|---|---|
| JP | 2006-251318 A | 9/2006 |
| JP | 2006-251543 A | 9/2006 |
| JP | 2006-267624 A | 10/2006 |
| JP | 2007-127855 A | 5/2007 |
| JP | 2009-128540 A | 6/2009 |
| JP | 2009-202549 A | 9/2009 |
| JP | 2011-017781 A | 1/2011 |
| WO | 2012/114714 A1 | 8/2012 |

* cited by examiner

INWARD ←——RADIAL DIRECTION——→ OUTWARD

OUTWARD ←——RADIAL DIRECTION——→ INWARD

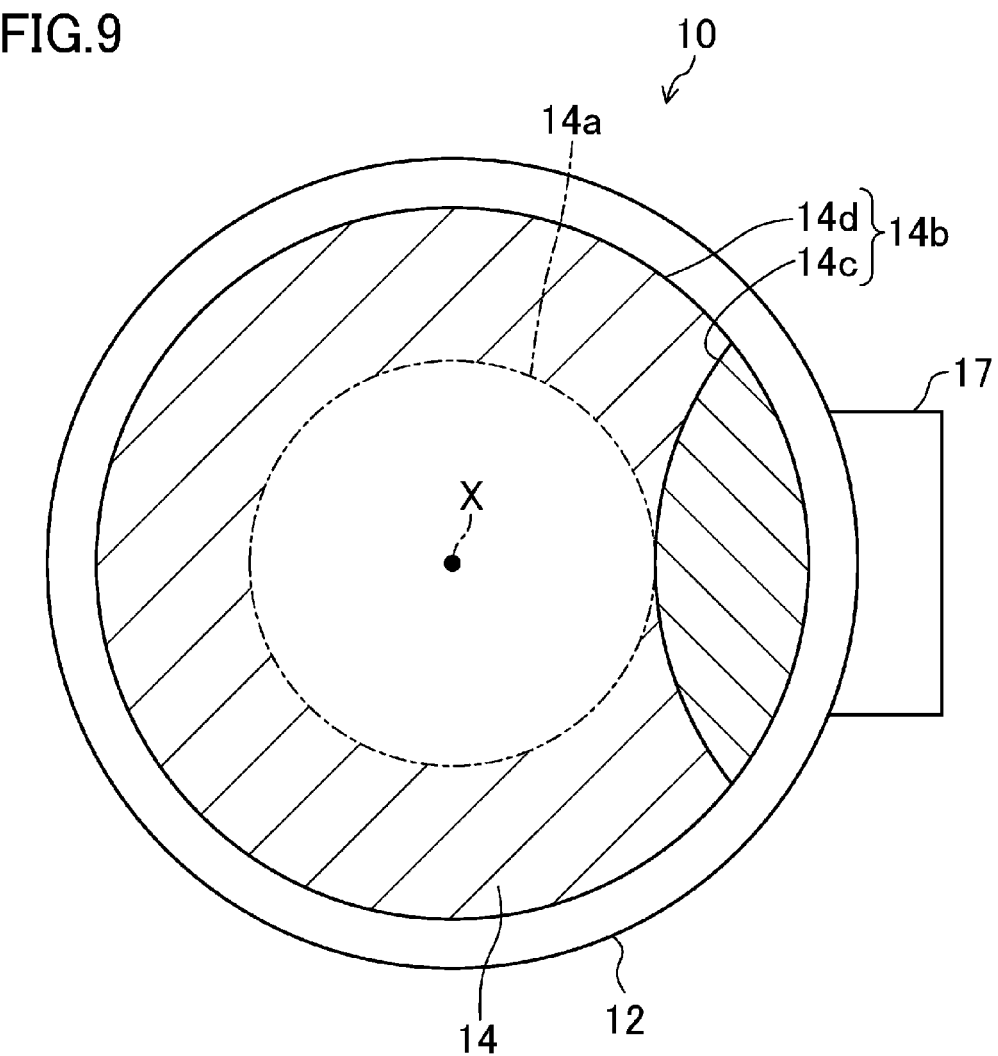

FIG.14A

OPTICAL ELEMENT, IMAGING APPARATUS INCLUDING THE ELEMENT, AND METHOD OF MANUFACTURING THE OPTICAL ELEMENT

CROSS-REFERENCE TO RELATED APPLICATION

This is a continuation of PCT International Application PCT/JP2013/002079 filed on Mar. 27, 2013, which claims priority to Japanese Patent Application No. 2012-085406 filed on Apr. 4, 2012. The disclosures of these applications including the specifications, the drawings, and the claims are hereby incorporated by reference in their entirety.

BACKGROUND

The present disclosure relates to optical elements having on their surface, an antireflection structure for reducing reflection of incident light.

In recent years, various types of optical elements having an antireflection structure for reducing reflection of light on their surface have been suggested.

In one suggested antireflection structure, fine structure units (e.g., a fine structure having groove or ridge projections or recesses, a fine structure having cone, pyramid, or column projections or recesses, etc.) are formed on the surface of an optical member at a pitch equal to or smaller than the wavelength of incident light.

For example, Japanese Patent Publication No. 2006-053220 shows an optical element having an antireflection structure on a real or virtual curved surface. The antireflection structure includes fine structure units arranged at a pitch equal to or smaller than the wavelength of light whose reflection is to be reduced.

SUMMARY

Some optical elements are manufactured by injection molding. In the injection molding, a melted molding material is injected into the cavity of a mold via a gate and solidified to manufacture an optical element.

However, the optical element manufactured in this method may include inaccurate formation around the gate. In this case, the antireflection performance in the first mold region degrades.

The present disclosure addresses the problem. The present disclosure improves the antireflection performance in a first mold region of an optical element.

The present disclosure targets an optical element obtained by injection molding. This optical element includes a plurality of projections arranged on a surface at a pitch smaller than or equal to a predetermined value to reduce reflection of light with a wavelength equal to or greater than the pitch, and a gate mark formed on an outer periphery of the optical element in the injection molding. A peripheral portion of the surface includes a first region whose circumferential position corresponds to the gate mark, and a second region being adjacent to the first region. Axes of the projections in the first region are inclined more outward than axes of the projections in the second region.

The present disclosure targets an imaging apparatus. This imaging apparatus includes the optical element.

The present disclosure targets a method of manufacturing an optical element including projections arranged on a surface at a pitch smaller than or equal to a predetermined value to reduce reflection of light with a wavelength equal to or greater than the pitch. The method includes preparing a mold provided with recesses corresponding to the projections, injecting a melted molding material into a cavity of the mold via a gate, and solidifying the molding material in the mold. The mold includes a first mold region and a second mold region. The first mold region is closer to the gate than the second mold region. The second mold region is adjacent to the first mold region. Axes of the recesses in the first old region are inclined more outward than axes of the recesses in the second mold region.

The optical element improves the antireflection performance in the first mold region.

The imaging apparatus improves the antireflection performance in the first mold region of the optical element.

The method of manufacturing an optical element provides the optical element with improved antireflection performance in the first mold region.

BRIEF DESCRIPTION OF THE DRAWINGS

FIG. 9 is a top view of the optical element.
FIGS. 14A-14H are perspective views of projections according to a variation.

DETAILED DESCRIPTION

An embodiment is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

1. Optical Element

Figure 1:
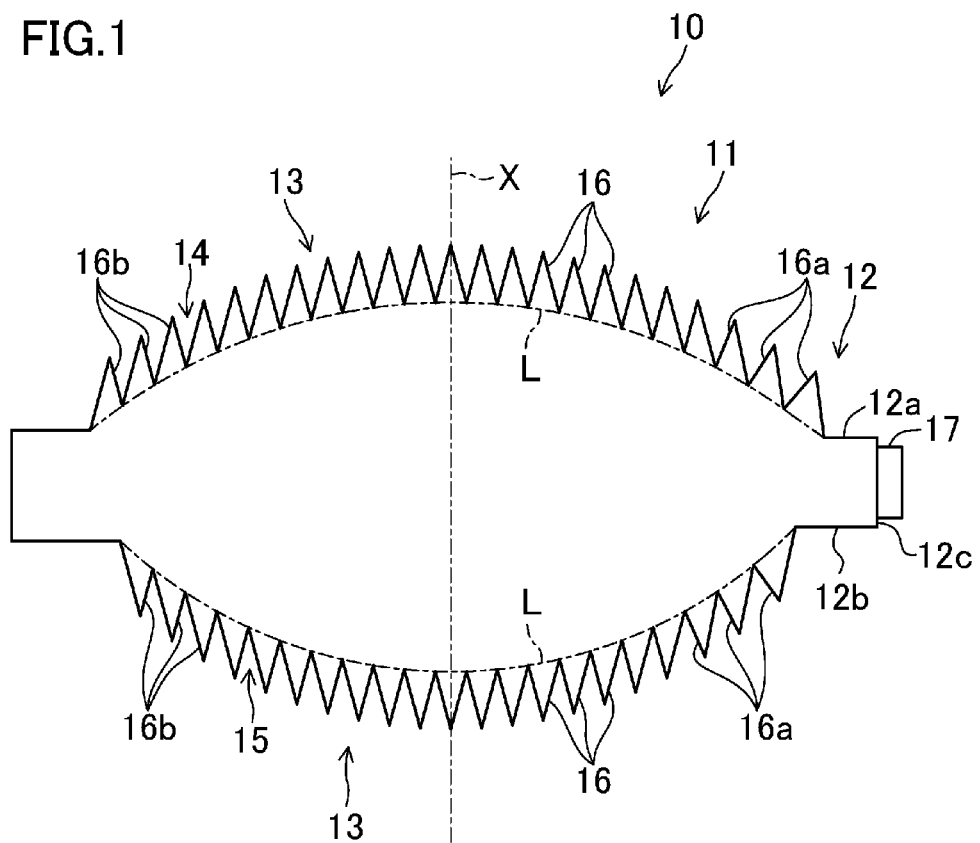
FIG. 1 is a cross-sectional view of an optical element.

FIG. 1 is a cross-sectional view of a lens 10. The lens 10 includes an optical portion 11 including an optical axis X, and an edge portion 12 provided in the outer periphery of the optical portion 11. The optical portion 11 and the edge portion 12 form an element body. The lens 10 is a biconvex lens. The lens 10 is a resin molded component manufactured by injection molding. The lens 10 is an example optical element.

The optical portion 11 includes a first optical surface 14 and a second optical surface 15. The first and second optical surfaces 14 and 15 are optical function surfaces (also referred to as "optically effective surfaces").

The edge portion 12 includes a first edge surface 12a at the side of the first optical surface 14, a second edge surface 12b at the side of the second optical surface 15, and an outer peripheral surface 12c. The first and second edge surfaces 12a and 12b are orthogonal to the optical axis X.

Each of the first and second optical surfaces 14 and 15 includes a sub-wavelength structure (SWS) 13. The SWS 13 is an example antireflection structure. The SWS 13 includes a plurality of fine structure units arranged at a pitch (period) smaller than or equal to a predetermined value, and reduces reflection of light with a wavelength equal to or greater than the pitch. In this embodiment, the structure units of the SWS 13 are projections 16. The projections 16 are cones. The pitch of the projections 16 is the distance between the tops of an adjacent pair of the projections 16 in the direction parallel to the surface, which is orthogonal to the optical axis X.

In the SWS 13, the plurality of projections 16 are arranged, thereby forming each of a plurality of recesses among the plurality of projections 16 to be surrounded by the projections 16. A virtual surface formed by connecting the bottoms (i.e., the lowermost portions) of the plurality of recesses is a base surface L. The base surface L is formed in a shape necessary for providing optical characteristics required for the lens 10. The base surface L is formed in a curve. For example, the base surface L is formed in a spherical, non-spherical, or free curve. Alternatively, the base surface L may be a plane.

Figure 2:
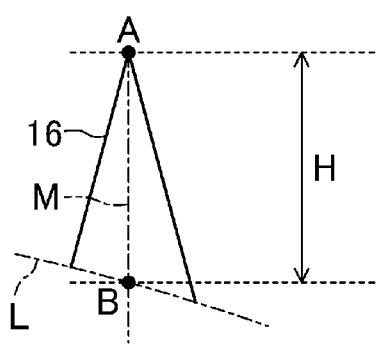
FIG. 2 is an enlarged cross-sectional view of each projection.

The height of each projection 16 in the optical axis direction is the distance between the apex of the projection 16 and the base surface L in the optical axis direction. FIG. 2 is an enlarged cross-sectional view of the projection 16. As shown in FIG. 2, the apex of the projection 16 is A, the segment extending from the apex A in the optical axis direction is M, and the intersection between the segment M and the base surface L is an intersection B. The height H of each projection 16 in the optical axis direction is defined by the distance between the apex A and the intersection B. The top of the actually molded projection 16 may have small curvature. In this case, the topmost portion is the apex A. Unless particularly stated, the "height(s) of the projection(s)" means the height(s) in the optical axis direction.

The SWS 13 reduces the reflection of light with the wavelength at least equal to or greater than the pitch of the projections 16. Where the lens 10 is used in an imaging optical system, the light whose reflection is to be reduced is visible light. In this case, since the target wavelength ranges from 400 nm to 700 nm, the pitch of the projections 16 is preferably 400 nm or less.

In view of providing an excellent antireflection effect, the heights of the projections 16 are preferably 0.4 or more times the target wavelength. Where the target wavelength is of visible light, the heights of the projections 16 are preferably 280 nm or more.

Furthermore, in order to prevent diffracted light in the SWS 13, the pitch of the projections 16 is preferably equal to or less than the quotient of dividing the target wavelength by the reflective index of the lens 10. Where the target wavelength is of visible light and the reflective index of the lens 10 is 1.5, the pitch of the projections 16 is preferably 266 nm or less.

At the optical function surfaces of the lens 10, the reflectivity is preferably low, and the transmittance is preferably high. For example, where the pitch of the projections 16 is 230 nm and the heights of the projections 16 are 350 nm, the reflectivity in the entire region of visible light ranges from 0.1 to 0.2%, both inclusive, thereby providing an excellent antireflection effect.

A gate mark 17 is located on the outer peripheral surface 12c of the edge portion 12. Where the lens 10 is manufactured by injection molding, the resin in the gate is solidified together with the lens 10, and the resin in the gate is connected to the lens 10 when demolding. The resin in the gate is cut off from the lens 10 with a cutter, etc. after the demolding, but partially remains. This residual portion is the gate mark 17. The gate mark 17 is not limited to the shape protruding outward from the outer peripheral surface 12c of the edge portion 12. For example, the resin in the gate connected to the lens 10 may be removed by cutting off the edge portion 12. That is, the edge portion 12 is partially cut off in a plane. In this case, the portion of the edge portion 12, which is cut off in the plane, is the gate mark 17. In short, the gate mark 17 may be in any shape, as long as being a mark indicating the position of the gate in the lens 10 molded in the injection molding.

2. Manufacturing Method

Figure 3:
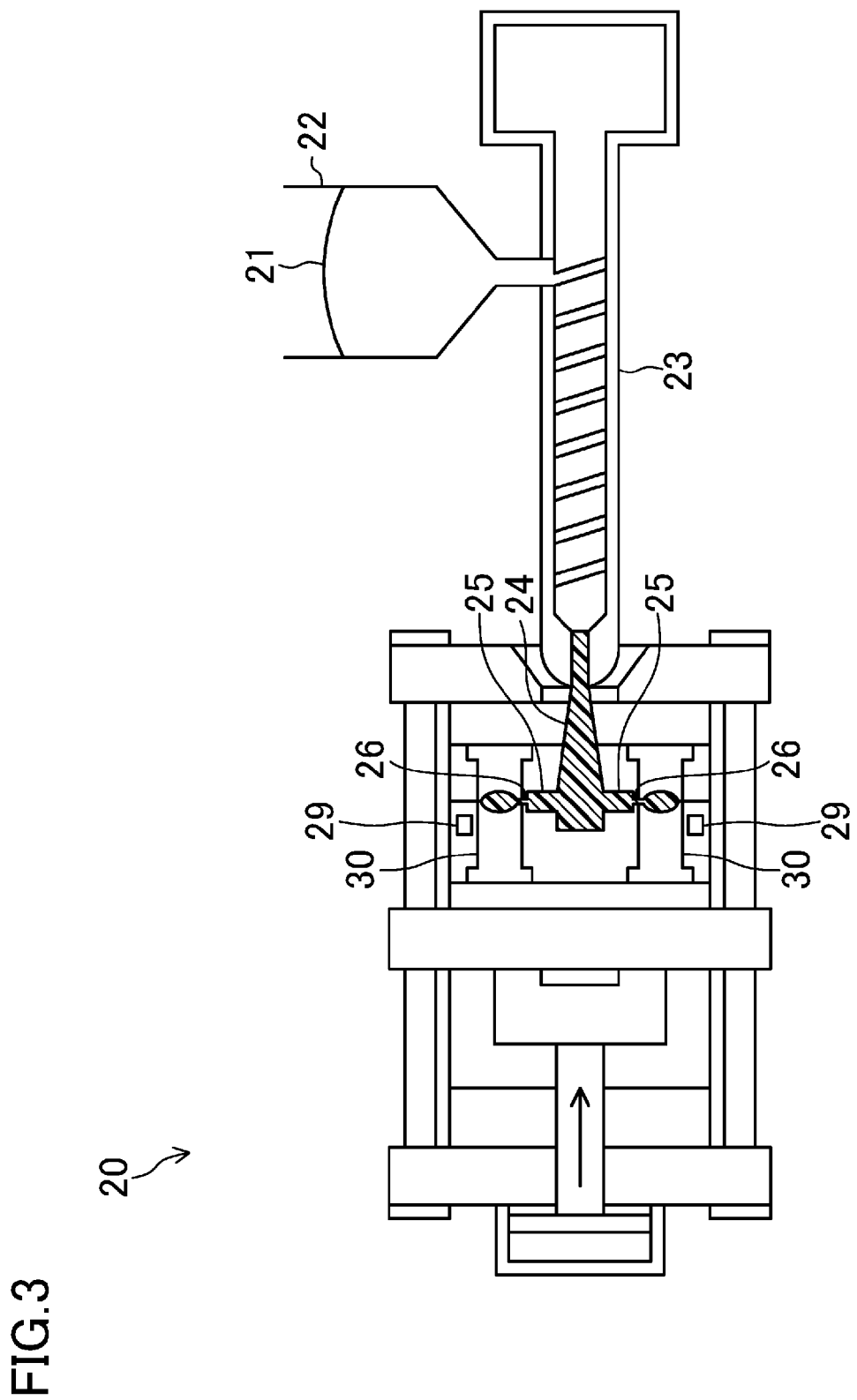
FIG. 3 illustrates the schematic configuration of injection molding equipment.

A manufacturing method of the lens 10 will be described below. FIG. 3 illustrates the schematic configuration of injection molding equipment 20 for molding lenses 10. The injection molding equipment 20 mainly includes a hopper 22, a screw 23, a sprue 24, runners 25, gates 26, molds 30, and temperature controllers 29.

First, each mold 30 is prepared and set in the injection molding equipment 20. The detailed configuration of the mold 30 will be described later.

Then, a resin material (i.e., a pellet material) 21 is put into the hopper 22. The put resin material 21 is heated while being measured by the screw 23. The heated resin material 21 is plasticized. The melted resin material 21 is injected to each mold 30 through the sprue 24, the runner 25, and the gate 26. The melted resin material 21 is injected into the cavity of the mold 30 to fill the cavity. The resin material 21 is an example molding material.

After that, the resin material 21 in the cavity is cooled and solidified by the temperature controller 29. At this time, the resin in the gate 26, the runner 25, and the sprue 24 is also solidified. Then, a first mold 31 and a second mold 32 are open to demold the lens 10. When the lens 10 is demolded, the resin in the gate 26, the runner 25, and the sprue 24 is solidified integral with the lens 10. This resin in the gate 26, the runner 25, and the sprue 24 is cut off at the position of the gate 26 by a cutter, etc. As a result, the gate mark 17 is formed in the lens 10.

The resin material 21 may be any material, as long as satisfying the reflective index and the variance required for the lens 10.

3. Strain

The lens 10 obtained by the injection molding shrinks while being cooled and solidified. The mold shrinkage ratio of the resin material for an optical element usually ranges from 0.1 to 1.0%. The mold shrinkage ratio is the ratio of the size of the molded lens to the size of the mold. The mold shrinkage ratio depends on the type of resin, molding conditions, and the form of a molding. The mold shrinkage ratio differs from position to position in the lens 10. Specifically, in the lens 10, the mold shrinkage ratio near the gate mark 17 differs from that in the other portion. Thus, strain caused near the gate mark 17 of the lens 10 differs from that caused in the other portion.

Specifically, in the injection molding, the filling rate of the resin may differ from position to position in the cavity. For example, in the cavity, the filling rate of the resin in the portion apart from the gate 26 is high. On the other hand, the resin filling the vicinity of the gate 26 has lower density than the resin in the other portion. The shrinkage amount in the portion containing the resin at low density is larger than that in the portion containing the resin at high density. Thus, in the cooling, the shrinkage amount of the resin filling the vicinity of the gate 26 is larger than that of the resin filling the other portion. As a result, the strain near the gate mark 17 of the lens 10 is greater than that in the other portion.

The shrinkage amount depends not only on the density of the resin but also on the difference in internal stress. When the molten resin flows in the cavity, shear force occurs in the molten resin. This shear force remains as the internal stress in the molten resin. While the molten resin is cooled and solidified, the internal stress causes strain. Where the internal stress is not uniform in the cavity, the strain becomes non-uniform, thereby causing a non-uniform shrinkage amount.

The shear force occurring in the molten resin will be described below. When the molten resin fills the cavity, the molten resin flows in the following two patterns.

In the first pattern, the molten resin, which has entered the cavity, reaches a portion of the cavity opposite to the gate 26, turns back from the portion, and then, flows into the mold surfaces of the first mold 31 and the second mold 32. Since the temperatures of the first mold 31 and the second mold 32 are usually lower than that of the molten resin, the molten resin, which has contacted the mold surfaces of the first mold 31 and the second mold 32, is cooled by the mold. At this time, a thin solidified layer called "skin layer" is formed on the surface of the molten resin. However, since the molten resin flows at the inner side of the skin layer, the shear force occurs between the molten resin and the skin layer.

In the second pattern, the molten resin gradually fills from the gate 26 to the opposite side of the gate 26. The molten resin sequentially flows from the gate 26 into the mold surfaces of the first mold 31 and the second mold 32. At this time, as well, the molten resin, which has contacted the mold surfaces, becomes a skin layer. Even after the skin layer is formed near the gate 26, the molten resin still flows into the cavity via the gate 26. This causes great shear force near the gate 26 between the skin layer and the molten resin.

In each pattern, since the molten resin largely moves near the gate 26, great shear force occurs as compared to the other portion. As shown in FIG. 3, the runner 25 usually has a greater diameter than the gate 26. Thus, the flow rate of the molten resin increases when flowing from the runner 25 into the gate 26. Thus, the molten resin flows at a high flow rate at the gate 26 in the cavity. That is, the shear force is more likely to occur near the gate 26. In this respect, as well, great shear force occurs in the molten resin near the gate 26 as compared to the other portion.

As such, in view of the great strain near the gate mark 17 of the lens 10, the portion of the mold 30 corresponding to the vicinity of the gate mark 17 has a different shape from the other portion.

4. Mold

Figure 4:
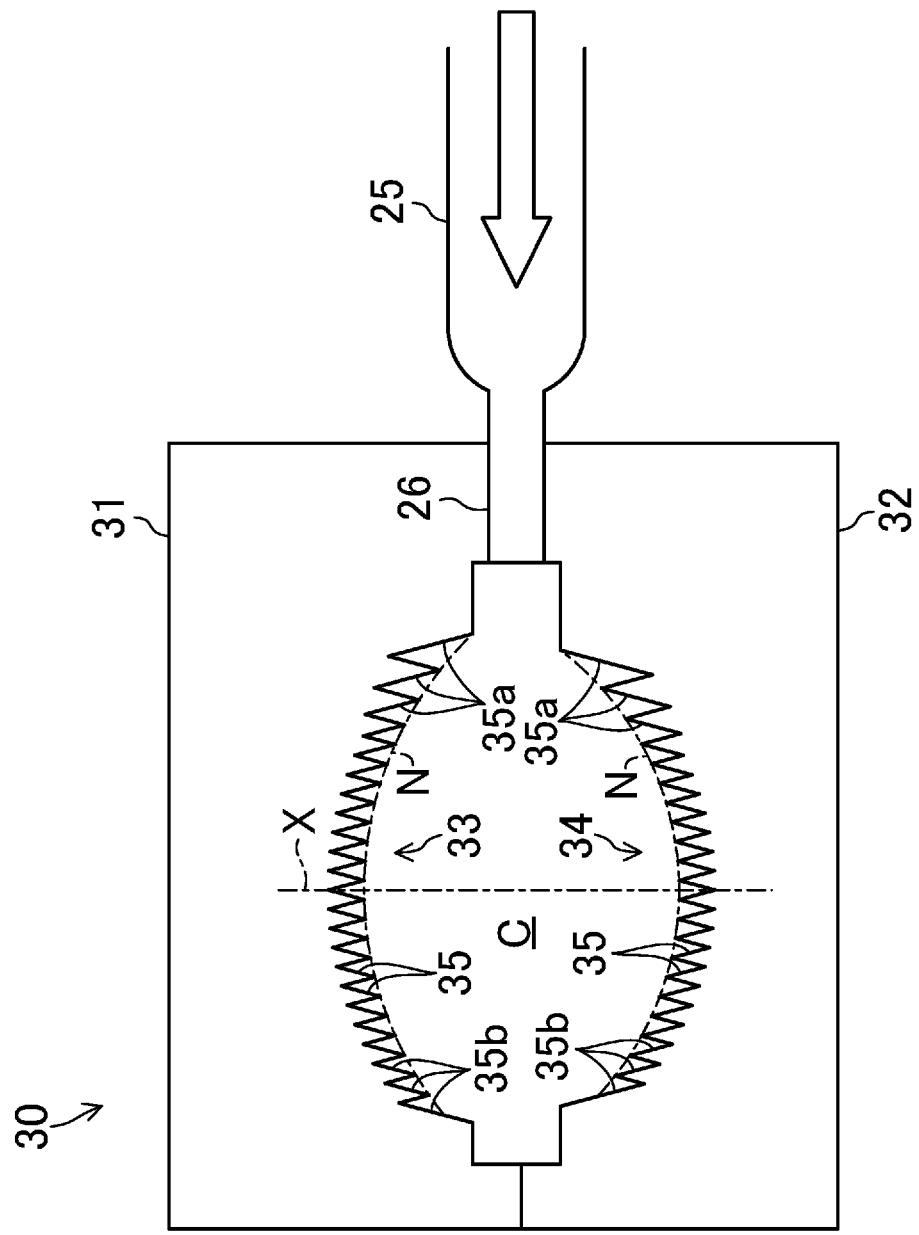
FIG. 4 is an enlarged cross-sectional view of a mold.
Figure 5:
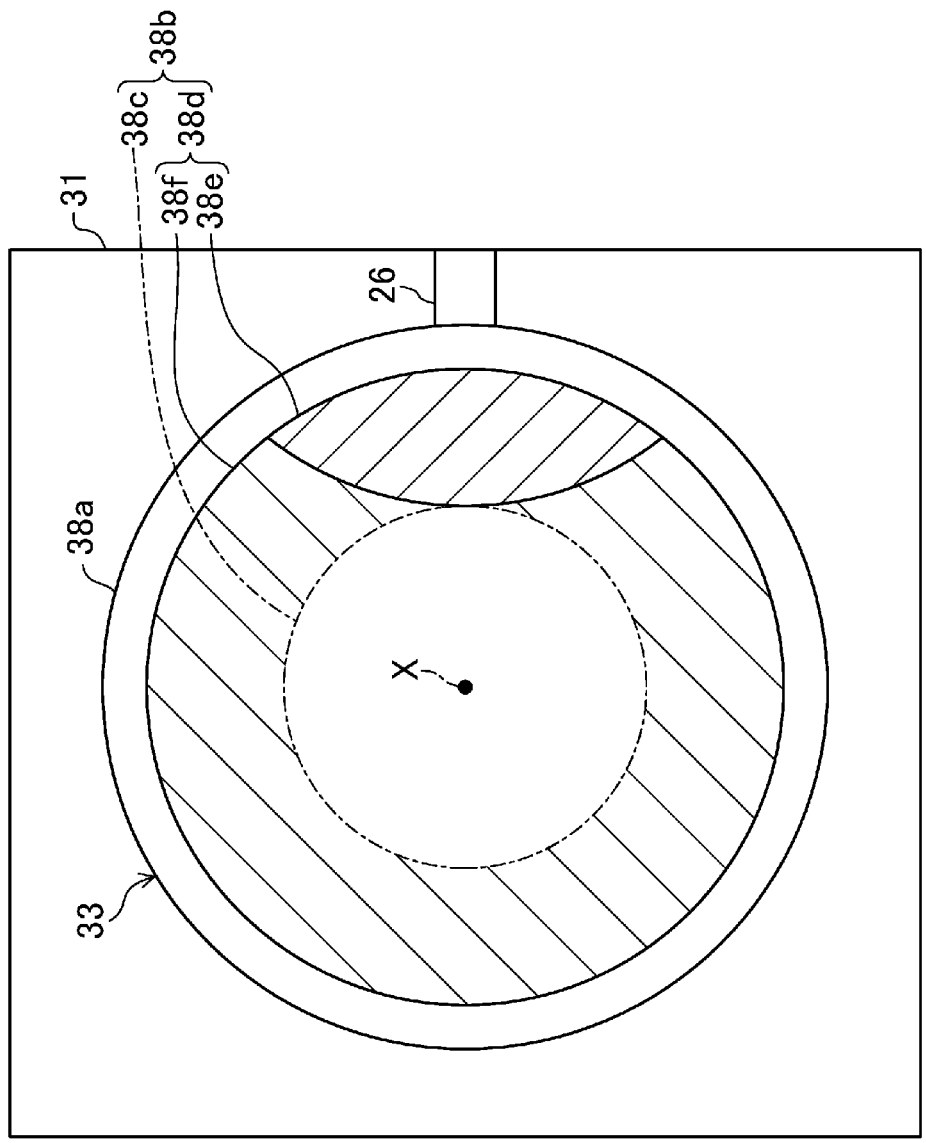
FIG. 5 illustrates the mold surface of a first mold.

The detailed shape of each mold 30 will be described below. FIG. 4 is an enlarged cross-sectional view of the mold 30. FIG. 5 illustrates a mold surface 33 of the first mold 31. The mold 30 includes the first mold 31 and the second mold 32. A cavity C is formed between the first mold 31 and the second mold 32. Fine structures for molding the SWS 13 are formed on the mold surfaces of the first mold 31 and the second mold 32. Recesses 35 corresponding to the projections 16 are formed in the portion of the mold surface 33 of the first mold 31, which corresponds to the first optical surface 14 of the lens 10. Similarly, the recesses 35 corresponding to the projections 16 are formed in the portion of a mold surface 34 of the second mold 32, which corresponds to the second optical surface 15 of the lens 10. The recesses 35 are substantially the inversion of the projections 16.

Specifically, the mold surface 33 includes an edge region 38a for molding the edge portion 12, and an optical region 38b for molding the first optical surface 14. The recesses 35 are formed in the optical region 38b. The optical region 38b includes a central region 38c, and a ring peripheral region 38d located outside the central region 38c. The peripheral region 38d includes a first mold region 38e whose circumferential position around the optical axis X corresponds to the circumferential position of the gate 26 (which includes the gate 26 in the circumferential direction), and a second mold region 38f adjacent to the first mold region 38e (which does not include the gate 26 in the circumferential direction). Hereinafter, the recesses 35 in the first mold region 38e are referred to as "first recesses 35a," and the recesses 35 in the second mold region 38f are referred to as "second recesses 35b." When there is no need to distinguish the first recesses 35a from the second recesses 35b, the recesses are collectively referred to as the "recesses 35."

The gate 26 corresponds to the outer peripheral surface 12c of the edge portion 12 of the lens 10, and is formed on the interface between the first mold 31 and the second mold 32.

Figure 6:
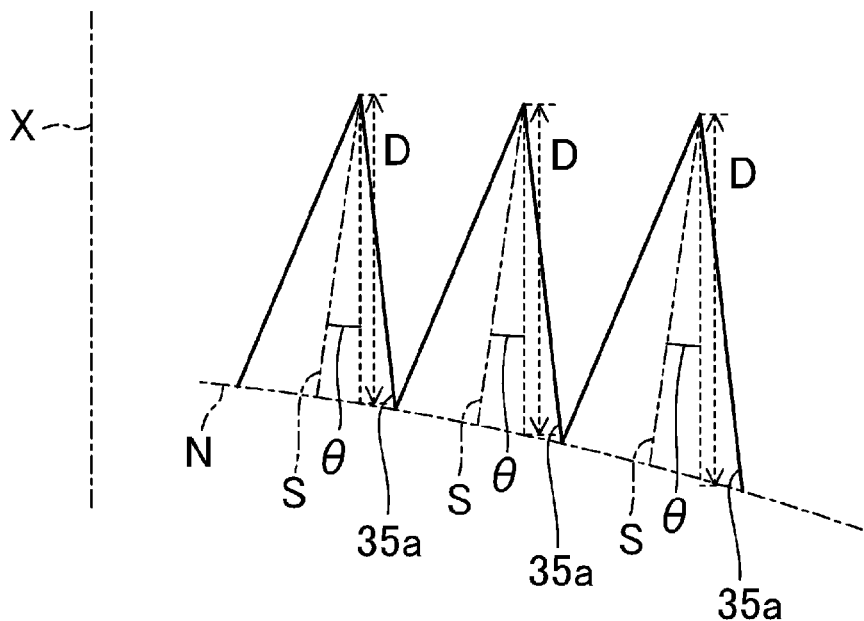
FIG. 6 is an enlarged cross-sectional view of first recesses.
Figure 7:
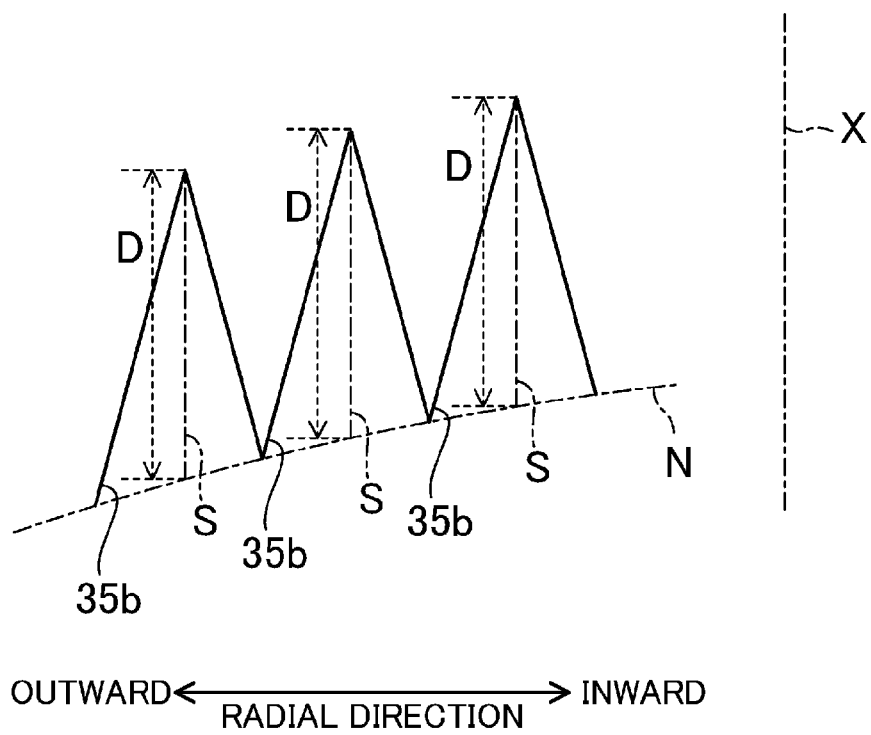
FIG. 7 is an enlarged cross-sectional view of second recesses.

FIG. 6 is an enlarged cross-sectional view of the first recesses 35a. FIG. 7 is an enlarged cross-sectional view of the second recesses 35b. The recesses 35 are cone-shaped holes, each of which includes an axis S. The axis S is here the axis of the cone, and in other words, a bisector of the vertex angle of the cone in the cross-section of each recess 35.

At the mold surfaces 33 and 34, the axes of the recesses 35 near the gate 26 are inclined more outward than the axes of the recesses 35 in the other portion.

Specifically, the axes S of the second recesses 35b extend parallel to the optical axis X. On the other hand, the axes S of the first recesses 35a are inclined outward in the radial direction around the optical axis X relative to the optical axis X. (In other words, the axes S are inclined such that their tops are located outermost in the radial direction.) That is, the axes S of the first recesses 35a are inclined more outward than the axes S of the second recesses 35b. Unless particularly stated, the "radial direction" hereinafter means the radial direction around the optical axis X.

For example, the inclined angles $\theta$ of the axes S of the first recesses 35a relative to the optical axis X are constant. The outward inclinations of the axes S in the radial direction may increase with the decreasing distance to the outermost of the first mold region 38e in the radial direction. Alternatively, the outward inclinations of the axes S in the radial direction may increase with the decreasing distance to the gate 26. That is, even in the same position in the radial direction, if the positions in the circumferential direction are different, the inclined angles of the axes S differ. Specifically, the axes S may be inclined more outward as the positions in the circumferential direction come closer to the gate 26.

In addition, at the mold surfaces 33 and 34, the recesses 35 near the gate 26 are formed deeper than the recesses 35 in the other portion. Specifically, the depths D of the first recesses 35a in the optical axis direction are greater than the depths D of the second recesses 35b in the optical axis direction. The depth D of each recess 35 in the optical axis direction is here the distance between the bottom (i.e., the apex of the cone) of the recess 35 and the intersection between a base surface N of the mold surface 33 and the straight line extending from the bottom of the recess 35 in the optical axis direction. The base surface N of the mold surface 33 is a virtual surface formed by connecting the apexes of the projections surrounded by the plurality of recesses 35, and corresponds to the base surface L of the lens 10. Unless particularly stated, the "depths of the recesses" means here the depths of the recesses 35 in the optical axis direction.

In the first mold region 38e, the depths of the first recesses 35a increase with the decreasing distance to the outermost in the radial direction. The depths D may increase with the decreasing distance to the gate 26. For example, the depths D of the first recesses 35a may increase with the increasing outward inclined angles of the axes S.

At the mold surface 33, the recesses 35 in the central region 38c have the same configuration as the second recesses 35b in the second mold region 38f. However, the recesses 35 in the central region 38c may have a different configuration from the second recesses 35b in the second mold region 38f.

The mold surface 34 of the second mold 32 has a similar configuration. That is, a ring peripheral region of the mold surface 34, which corresponds to the peripheral portion of the second optical surface 15, includes a first mold region whose circumferential position corresponds to the circumferential position of the gate 26, and a second mold region adjacent to the first mold region. The axes of the recesses 35 in the first mold region are inclined more outward than the axes of the recesses 35 in the second mold region.

Next, a formation method of the first mold 31 and the second mold 32 having such configurations will be described.

FIG. 8 illustrates steps for forming the first mold 31 for molding the lens 10. While the first mold 31 will be described here as an example, the second mold 32 may be obtained by similar steps.

Figure 8A:
FIGS. 8A-8F illustrate steps for forming the first mold.

First, a mold base material 41 is prepared. Then, as shown in FIG. 8A, the inversion of the lens 10 is formed in the mold base material 41 by mechanical processing. In this stage, the inversion of the lens 10 is the inversion of the lens 10 without the projections 16, and corresponds to the base surface L of the lens 10. The mold base material 41 may be any material, which has high strength and is finely processable by etching. For example, the mold base material 41 may be quartz ($SiO_2$), silicon (Si), glassy carbon (GC), silicon carbide (SiC), tungsten carbide (WC), etc.

Figure 8D:
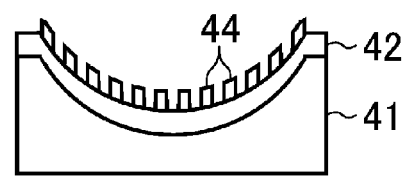
Figure 8B:
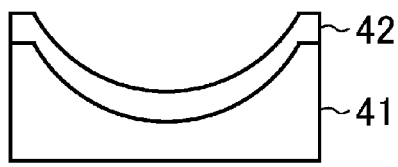

Next, as shown in FIG. 8B, a metal mask 42 is formed on the surface of the mold base material 41. The metal mask 42 may be formed by sputtering, deposition, etc. The metal mask 42 may be made of Cr, Ta, WSi, Ni, W, etc.

Figure 8E:
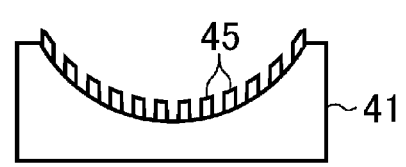
Figure 8C:
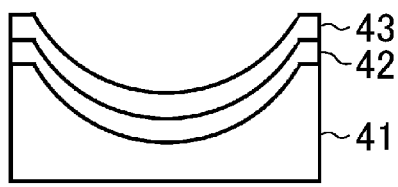

Then, as shown in FIG. 8C, a resist mask 43 is formed on the metal mask 42. The resist mask 43 may be formed by spin coating, spray coating, etc.

After that, as shown in FIG. 8D, a resist dot pattern 44 corresponding to the SWS 13 is formed from the resist mask 43. The resist dot pattern 44 may be formed by electron-beam printing, interference exposure (e.g., hologram exposure), etc.

Next, as shown in FIG. 8E, the resist dot pattern 44 is transferred on the metal mask 42 by dry etching. As a result, a metal mask dot pattern 45 is formed. The metal mask dot pattern 45 may be formed by wet etching.

Figure 8F:
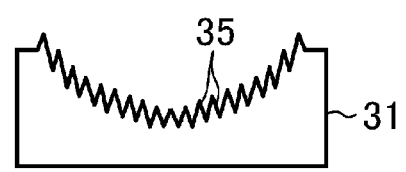

Then, as shown in FIG. 8F, the metal mask dot pattern 45 is transferred on the mold base material 41 by dry etching. As a result, the recesses 35, which are the inversion of the projections 16, are formed at the surface of the mold base material 41.

The dry etching using the metal mask dot pattern 45 is individually performed in the first mold region 38e and the second mold region 38f, thereby controlling the inclinations of the axes S of the first recesses 35a in the first mold region 38e. For example, a mask is provided in the first mold region 38e, and the second mold region 38f is dry etched to form the second recesses 35b. Then, the mask in the first mold region 38e is removed, and a mask is provided in the second mold region 38f. The first mold region 38e is dry etched with the mold inclined more than that in the dry etching of the second mold region 38f to form the first recesses 35a. As a result, the axes S of the first recesses 35a can be inclined relative to the axes S of the second recesses 35b.

As a result, the first mold 31 is formed.

5. Detailed Configuration of Lens

Then, the detailed configuration of the lens 10 manufactured by using the mold 30 will be described. FIG. 9 is a top view of the lens 10.

The first optical surface 14 includes a central portion 14a including the optical axis X, and a peripheral portion 14b located outside the central portion 14a. The peripheral portion 14b includes a first region 14c whose circumferential position corresponds to the gate mark 17 (which includes the gate mark 17 in the circumferential direction), and a second region 14d adjacent to the first region 14c (which does not include the gate mark 17 in the circumferential direction). The central portion 14a is molded using the central region 38c of the first mold 31. The peripheral portion 14b is molded using the peripheral region 38d of the first mold 31. The first region 14c is molded using the first mold region 38e of the first mold 31. The second region 14d is molded using the second mold region 38f of the first mold 31. For example, as viewed from top, the first region 14c is the overlapping region between the first optical surface 14 and a circle with a radius of ¼ the diameter of the lens 10 around 17. The first region 14c is not limited thereto. It may be the overlapping region between the first optical surface 14 and a circle with a radius of ⅕ the diameter of the lens 10 around 17. The first region 14c is not limited to the shape defined by two arcs, and may have any shape. For example, the first region 14c may be a region formed by cutting the peripheral portion 14b along two radiuses with predetermined angular widths.

Figure 10:
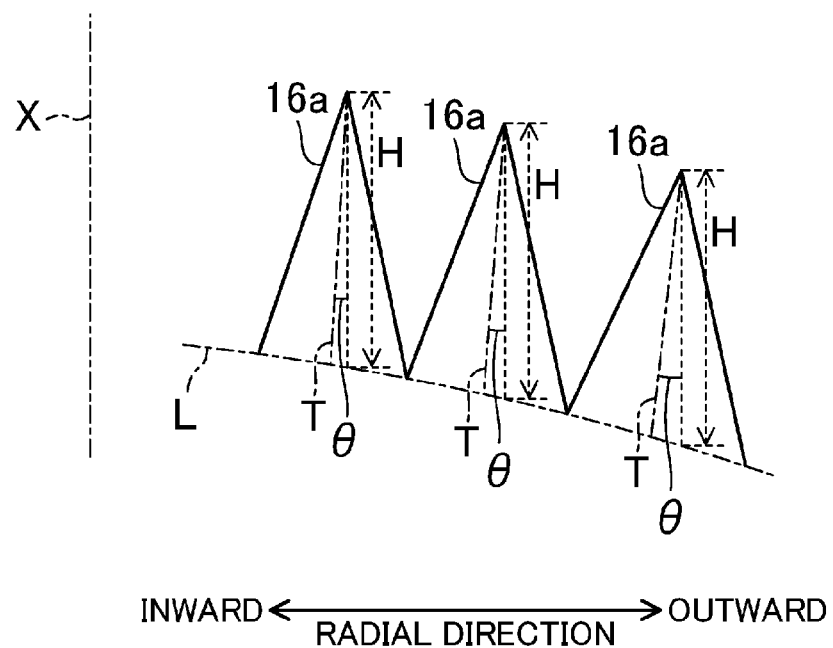
FIG. 10 is an enlarged cross-sectional view of second projections.
Figure 11:
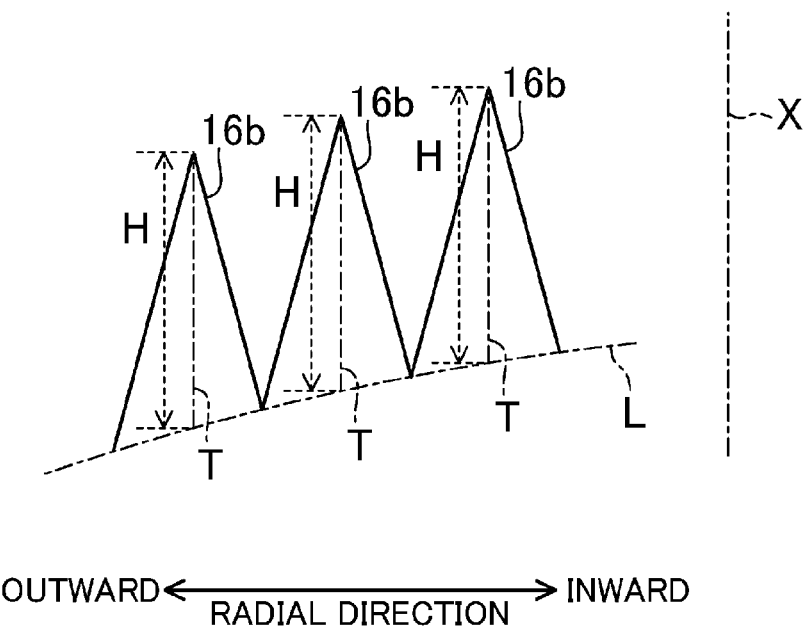
FIG. 11 is an enlarged cross-sectional view of first projections.

The shapes of the projections 16 in the first region 14c differ from the shapes of the projections 16 in the second region 14d. Hereinafter, the projections 16 in the first region 14c are referred to as "first projections 16a," and the projections 16 in the second region 14d are referred to as "second projections 16b." When there is no need to distinguish the first projections 16a from the second projections 16b, the projections are collectively referred to as the "projections 16." FIG. 10 is an enlarged cross-sectional view of the first projections 16a. FIG. 11 is an enlarged cross-sectional view of the second projections 16b.

As shown in FIG. 11, the axes T of the second projections 16b extend parallel to the optical axis X. Each axis T is the axis of the cone, and in other words, a bisector of the vertex angle of the cone in the cross-section of the projections 16.

As shown in FIG. 10, the axes T of the first projections 16a are inclined relative to the optical axis X. Specifically, the first projections 16a are inclined such that their tops are located outermost in the radial direction. That is, the axes T of the first projections 16a are inclined more outward in the radial direction than the axes T of the second projections 16b.

The outward inclinations of the axes T in the radial direction (e.g., the inclinations of the axes T relative to the optical axis X) increase with the decreasing the distance to the outermost of the first region 14c in the radial direction. The outward inclinations of the axes T in the radial direction may increase with the decreasing distance to the gate mark 17. That is, even in the same position in the radial direction, if the positions in the circumferential direction are different, the inclinations of the axes T differ. Specifically, the axes T are inclined more outward as the positions of the first projections 16a in the circumferential direction come closer to the gate mark 17.

As such, the axes T of the first projections 16a are inclined outward, thereby facilitating the demolding of the lens 10 from the mold 30, and reducing deformation of the first projections 16a.

Figure 12:
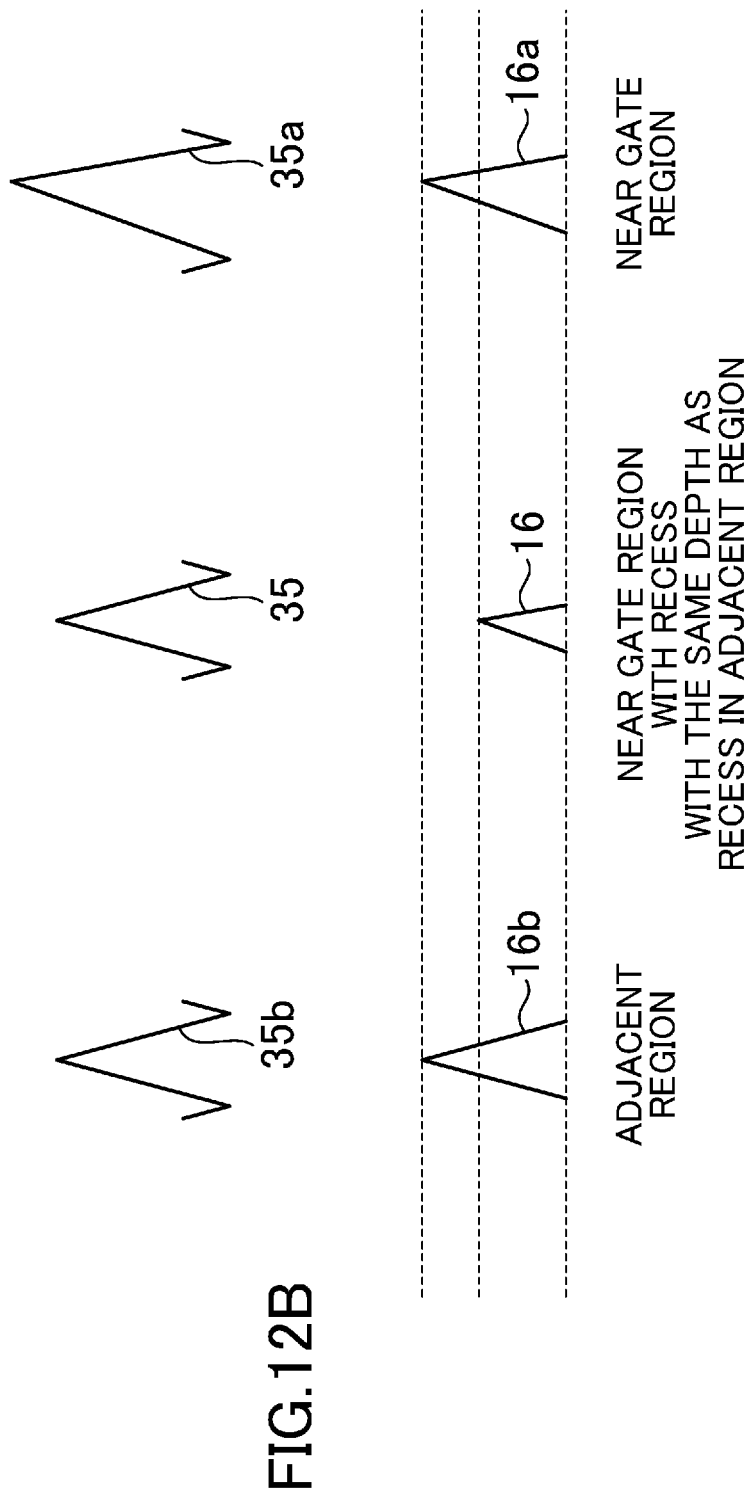
FIG. 12A illustrates enlarged cross-sectional views of various recesses.
FIG. 12B illustrates enlarged cross-sectional views of projections corresponding to the recesses of FIG. 12A.

Reasons will be described with reference to FIGS. 12A and 12B. FIG. 12A illustrates enlarged cross-sectional views of various recesses 35. FIG. 12B illustrates enlarged cross-sectional views of the projections 16 corresponding to the recesses 35 in FIG. 12A. FIGS. 12A and B respectively show, on the left, one of the second recesses 35b in the second mold region 38f, and one of the second projections 16b in the second region 14d. FIGS. 12A and B respectively show, on the right, one of the first recesses 35a in the first mold region 38e, and one of the first projections 16a in the first region 14c. FIGS. 12A and B show, in the center, a recess 35 and a projection 16 where the depth and the angle of the axis T of the recess 35 in the first mold region 38e are equal to those of the second recess 35b. FIGS. 12A and 12B show the recesses 35 and the projections 16 on the assumption that the base surfaces N and L are planes orthogonal to the optical axis X (i.e., horizontal planes). In FIGS. 12A and 12B, the outermost in the radial direction is on the right, and the innermost in the radial direction is on the left.

As shown on the left of FIGS. 12A and 12B, in the second region 14d (i.e., the second mold region 38f), the second projection 16b shrinks in the solidification to be smaller than the second recess 35b, but the shape of the second recess 35b is accurately transferred.

However, in the first region 14c near the gate mark 17, the shape is inaccurately transferred from the recess 35 to the projection 16. Specifically, in the lens 10, since the shrinkage amount increases with the decreasing distance to the outermost in the radial direction, the shrinkage amount in the first mold region 38e is larger than that in the central region 38c. Thus, the first projection 16a in the first region 14c shrinks more inward in the radial direction with the decreasing distance to the outermost in the radial direction. As a result, the axis T of the first projection 16a in the peripheral portion 14b tends to be inclined outward in the radial direction. However, the inclination of the axis T is not largely influenced only by the difference in the shrinkage amount depending on the position in the radial direction. In addition, as described above, the density of the resin in the first recess 35a is low, and great internal stress remains in the resin around the first recess 35a. Thus, the shrinkage amount of the resin in the first mold region 38e is the largest in the peripheral region 38d. That is, due to the outermost location in the radial direction, the low density of the resin, and the great residual internal stress, the axis T of the projection 16 is largely inclined outward in the radial direction in the first mold region 38e, as shown in FIG. 12B. Furthermore, not only the axis T is inclined, but also the height of the projection 16 is reduced, since the shrinkage amount is large in the first mold region 38e.

When the shrinkage amount is large, the first projection 16a is in the solidification, pressed onto the inner wall of the recess 35, which is at the inner side in the radial direction, by greater force than the second projection 16b. When the lens 10 tightly contacts the recess 35 by high pressure, it may be difficult to demold the lens 10 from the mold 30. Furthermore, when it is demolded with the first projection 16a tightly contacting the recess 35 with great pressing force, the friction force may deform the first projection 16a. Additionally, a space may be formed between the first projection 16a and the inner surface of the recess 35, which is at the outer side in the radial direction, or the pressing force of the first projection 16a at the outer side in the radial direction may decrease, while the first projection 16a tightly contacts the inner surface of the recess 35, which is at the inner side in the radial direction, with great pressing force. That is, the force of the inner surfaces of the recess 35 to the first projections 16a is not uniform. This results in further deformation of the first projection 16a in the demolding.

Thus, as shown on the left of FIGS. 12A and 12B, the axis S of the first recess 35a is inclined more outward than the axis S of the second recess 35b by a predetermined angle θ. The inner surface of the first recess 35a, which is at the inner side in the radial direction, is originally inclined outward. By inclining the axis S outward, the inner surface of the first recess 35a, which is the inner side in the radial direction, is inclined more outward. Thus, out of the pressing force of the first projection 16a, the component vertically acting on the inner surface, which is at the inner side in the radial direction, reduces, and the component acting in the direction of demolding the first projection 16a from the first recess 35a increases. As a result, the contacting force between the first projection 16a and the first recess 35a decreases, thereby accelerating the demolding. Since the component vertically acting on the inner surface, which is at the inner side in the radial direction, reduces, the non-uniformity of the force of the inner surface on the first projection 16a reduces, thereby reducing the deformation of the first projection 16a.

In addition, the depths D of the first recesses 35a are greater than the depths D of the second recesses 35b. As a result, even if the shrinkage amount of the first projections 16a is large and the axes T are inclined, the heights of the first projections 16a can be substantially equal to those of the second projections 16b.

Note that the depths D of the first recesses 35a may not be greater than those of the second recesses 35b. In this case, the heights H of the first projections 16a differ from the heights H of the second projections 16b.

The second optical surface 15 has a similar configuration. That is, the peripheral region of the second optical surface 15 includes a first region whose circumferential position corresponds to the gate mark 17, and a second region adjacent to the first region. The axes of the projections in the first region are inclined more outward than the axes of the projections in the second region.

6. Camera

Figure 13:
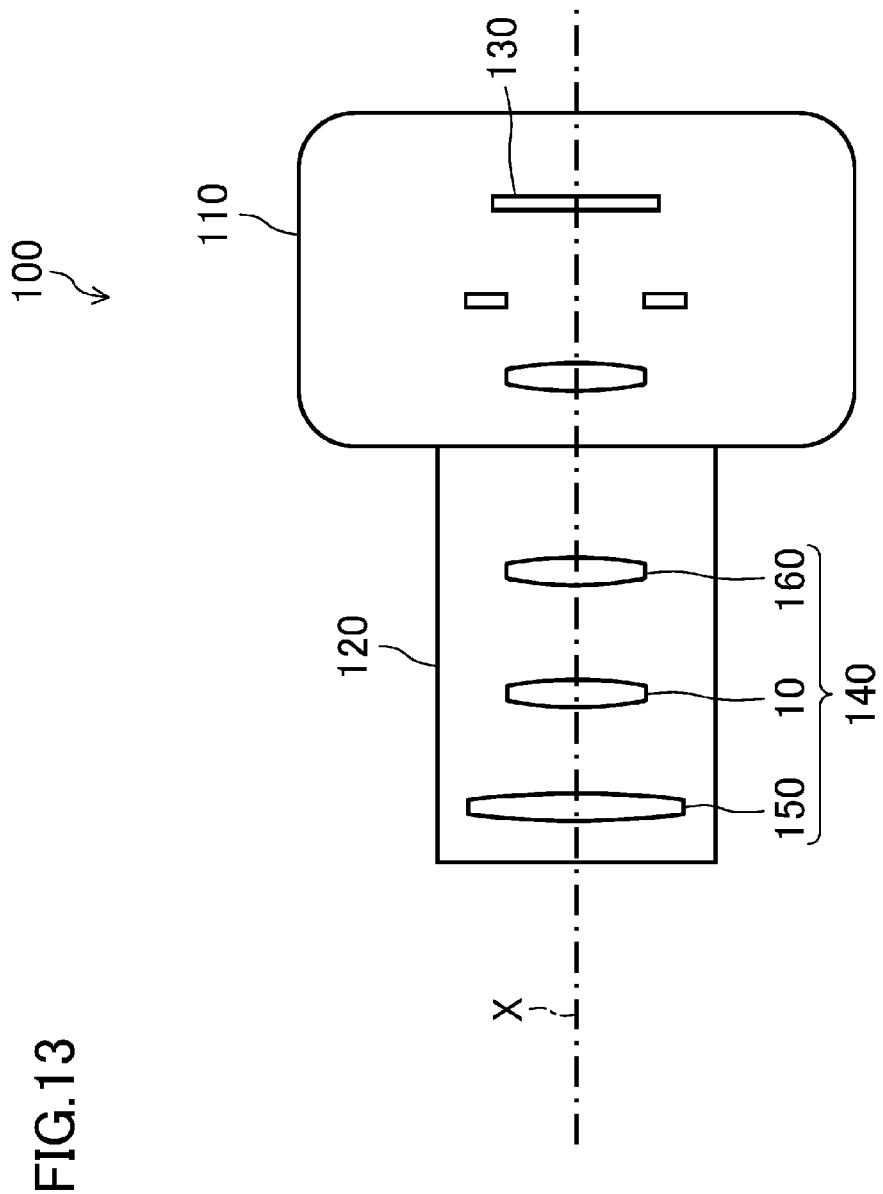
FIG. 13 is a schematic view of a camera.

Next, a camera 100 including the lens 10 will be described. FIG. 13 is a schematic view of the camera 100.

The camera 100 includes a camera body 110, and an interchangeable lens 120 attached to the camera body 110. The camera 100 is an example imaging apparatus.

The camera body 110 includes an imaging device 130.

The interchangeable lens 120 is detachable from the camera body 110. The interchangeable lens 120 is, for example, a telephoto zoom lens. The interchangeable lens 120 includes imaging optics 140 for focusing a beam on the imaging device 130 of the camera body 110. The imaging optics 140 include the lens 10, and refractive lenses 150 and 160. The lens 10 functions as a lens element.

7. Advantages

The lens 10 includes the plurality of projections 16 arranged at the first optical surface 14 at the pitch smaller than or equal to a predetermined value to reduce reflection of light with a wavelength equal to or greater than the pitch, and the gate mark 17 formed on an outer periphery in the injection molding. The peripheral portion 14b of the first optical surface 14 includes, the first region 14c whose circumferential position corresponds to the gate mark 17, and the second region 14d adjacent to the first region 14c. The axes T of the first projections 16a in the first region 14c are inclined more outward than the axes T of the second projections 16b in the second region 14d.

In the above-described configuration, the axes T of the first projections 16a in the first region 14c are inclined more outward than the axes T of the second projections 16b in the second region 14d. Thus, out of the pressing force of the first projections 16a to the recesses 35, which is caused by the inward shrinkage of the lens 10 in the radial direction in the cooling, the component vertically acting on the inner surfaces of the recesses 35 reduces, and the component in the direction of demolding the first projections 16a from the recesses 35 increases. As a result, the contacting force between the lens 10 and the mold 30 in the first region 14c can be reduced, thereby facilitating the demolding of the lens 10 from the mold 30. In addition, the deformation of the first projections 16a in the first region 14c in the demolding can be reduced, thereby improving the antireflection performance.

The heights H of the first projections 16a in the first region 14c in the optical axis direction are substantially equal to the heights H of the second projections 16b in the second region 14d in the optical axis direction.

In the above-described configuration, the heights H of the projections 16 (i.e., the first projections 16a) close to the gate mark 17 are substantially equal to the heights H of the projections 16 apart from the gate mark 17. As a result, the antireflection performance of the lens 10 close to the gate mark 17 can be substantially equal to the antireflection performance in the other portion.

The axes T of the second projections 16b in the second region 14d extend in the optical axis direction. The axes T of the first projections 16a in the first region 14c are inclined outward relative to the optical axis X.

That is, in the second region 14d, the axes T of the second projections 16b extend in the optical axis direction, and the second projections 16b effectively act on light incident from the optical axis direction.

The camera 100 includes the lens 10.

The above-described configuration improves the antireflection performance inside the camera 100.

The manufacturing method of the lens 10 includes the step of preparing the molds 30 provided with the recesses 35 corresponding to the projections 16, the step of injecting the melted resin material into the cavity C of the mold 30 with the melted resin material 21 via the gate 26, and the step of solidifying the resin material 21 in the mold 30. The mold 30 includes the first mold region 38e close to the gate 26, and the second mold region 38f adjacent to the first mold region 38e. The axes S of the first recesses 35a in the first mold region 38e are inclined more outward than the axes S of the second recesses 35b in the second mold region 38f.

With this configuration, the shrinkage amount of the resin material 21 in the first mold region 38e close to the gate 26 is larger than that in the second mold region 38f. Thus, in the first mold region 38e, the lens 10 tends to firmly contact the mold 30 and is difficult to demold. By contrast, by inclining the axes S of the first recesses 35a more outward than the axes S of the second recesses 35b, out of the pressing force of the projections to the recesses 35, which is caused in the lens 10 in the cooling, the component vertically acting on the inner surfaces of the recesses 35 decreases, and the component in the direction of demolding the projections from the recesses 35 increases. This reduces the contacting force between the lens 10 and the mold 30 in the first mold region 38e, thereby facilitating the demolding of the lens 10 from the mold 30. In addition, the deformation of the projections molded using the first recesses 35a in the demolding can be reduced, thereby improving the antireflection performance.

The recesses 35 are formed in the portion of the mold 30 corresponding to the surface of the lens 10. The gate 26 is formed in the portion of the mold 30 corresponding to the outer periphery of the lens 10. The first mold region 38e and the second mold region 38f are formed in the portion of the mold 30 corresponding to the peripheral portion 14b of the surface of the lens 10. The first mold region 38e is formed in the portion whose circumferential position corresponds to the circumferential position of the gate 26.

In the above-described configuration, the region, in which the axes S of the recesses 35 are inclined outward, are provided in the portion of the mold 30 corresponding to the peripheral portion 14b of the surface of the lens 10. Specifically, the portion includes the second mold region 38f, in which the axes S of the recesses 35 are not inclined outward or inclined outward at a small angle, and the first mold region 38e, in which the axes S of the recesses 35 are inclined outward at a great angle. The circumferential position of the first mold region 38e corresponds to the circumferential position of the gate 26.

Other Embodiments

As described above, the embodiment has been described as example techniques disclosed in the present application. However, the techniques according to the present disclosure are not limited to these embodiments, but are also applicable to those where modifications, substitutions, additions, and omissions are made. In addition, elements described in the embodiment may be combined to provide a different embodiment. Elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

In the above-described embodiment, the following configuration may be used.

While the SWS 13 is formed on each of the first optical surface 14 and the second optical surface 15 only, the surfaces provided with the SWS 13 are not limited thereto. The SWS 13 may be formed in the edge portion 12. The SWS 13 is not necessarily provided on each of the first optical surface 14 and the second optical surface 15, the SWS 13 may be provided on one of the surfaces only.

While the lens 10 is biconvex, the shape is not limited thereto. For example, the lens 10 may biconcave, convex meniscus, or concave meniscus. An optical element which has the SWS 13 may not function as a lens element.

Figure 14D:
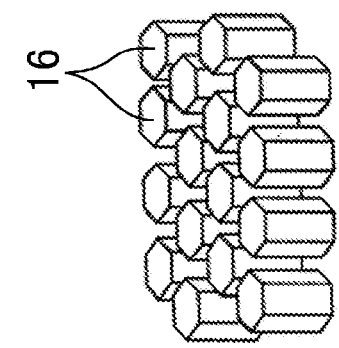
Figure 14C:
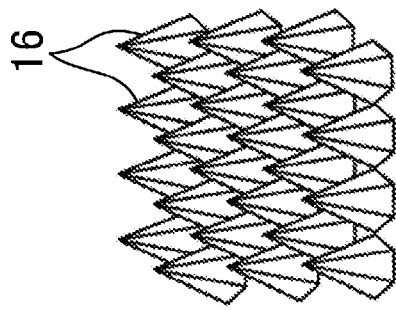
Figure 14B:
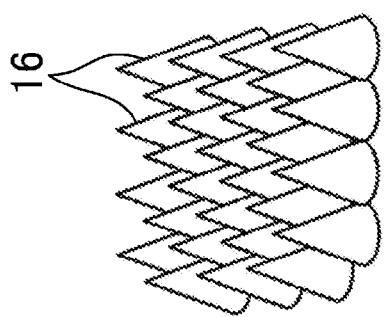
Figure 14H:
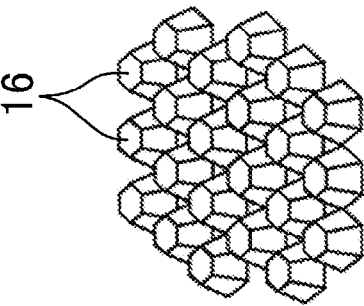
Figure 14G:
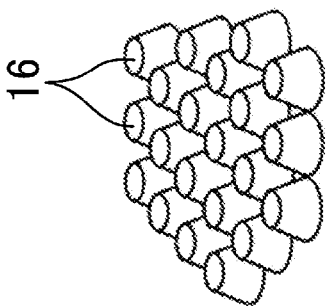
Figure 14F:
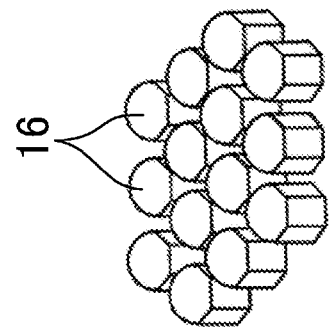
Figure 14E:
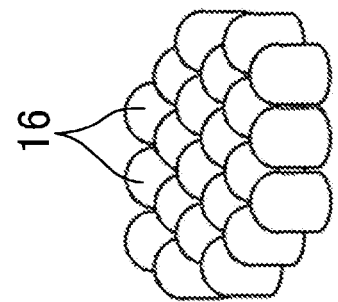

While the structure units of the SWS 13 are cones (see FIG. 14A), the shapes of the structure units are not limited thereto. For example, as shown in FIG. 14B, the structure units may be pyramids such as hexagonal pyramids and square pyramids. The structure units may be cylinders shown in FIG. 14C, or prisms shown in FIG. 14D. As shown in FIGS. 14E and 14F, the structure units may be cylinders or prisms with rounded tops. As shown in FIGS. 14G and 14H, the structure units may be truncated cones or truncated pyramids.

The structure units may be projections, each of which is provided as a result of forming a plurality of recesses to be surrounded by the plurality of recesses. That is, the projections have a relative relationship with the recesses. In the SWS, while each recess is formed among the plurality of projections, each projection is formed among the plurality of recesses. In short, the SWS is deemed as the arrangement of a plurality of projections, or the arrangement of a plurality of recesses. The present disclosure deems the SWS as the arrangement of a plurality of projections, and specifies the configurations of the projections, or the configurations of recesses in a mold, which correspond to the projections.

As such, the structure units are not necessarily in an exact geometric shape. The structure units may be in any shape, as long as being in a raised shape, and can be arranged at a pitch smaller than the wavelength of light whose reflection is to be reduced.

The axes T of the first projections 16a may be parallel to the optical axis X. In view of the fact that the first projections 16a tend to be inclined outward in the radial direction after the molding, the first recesses 35a of the mold 30 may be configured in advance such that the axes S are inclined inward in the radial direction. The axes T of the first projections 16a are not necessarily inclined outward in the exact radial direction. The axes T may be inclined in any direction toward the outside of the first optical surface 14. That is, the axes T only need to be inclined such that their tops are located outside the circle passing through the intersections between the base surface L and the bisector of the vertex angle of the first projections 16a in the cross-section around the optical axis X.

The heights H of the first projections 16a may differ from the heights H of the second projections 16b.

Various embodiments have been described above as example techniques of the present disclosure, in which the attached drawings and the detailed description are provided.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

As described above, the present disclosure is useful as an optical element having an antireflection structure for reducing reflection of incident light. With use of the optical element of the present disclosure, for example, various optics such as high-grade imaging optics, object optics, scanning optics, and pickup optics; optical units such as tube units, light pickup units, and imaging units; imaging apparatuses, light pickup devices, optical scanning devices, etc., can be provided.

What is claimed is:

1. An optical element obtained by injection molding, the element comprising:
    a plurality of projections arranged on a surface at a pitch smaller than or equal to a predetermined value to reduce reflection of light with a wavelength equal to or greater than the pitch; and
    a gate mark formed on an outer periphery of the optical element in the injection molding, wherein:
    an optical axis of the optical element passes through the surface,
    the surface includes at least a first region and a second region, the first region being located between the gate mark and the second region, the projections in the first region each having a first axis and the projections in the second region each having a second axis,
    at least a part of the first region and a part of the second region has the same distance from the optical axis, and
    each of the first axis of the projections in the part of the first region is inclined more outwardly relative to the optical axis of the optical element than each of the second axis of the projections in the part of the second region.

2. The optical element of claim 1, wherein heights of the projections in the part of the first region in an optical axis direction are substantially equal to heights of the projections in the part of the second region in the optical axis direction.

3. The optical element of claim 1, wherein:
    each of the second axis of the projections in the part of the second region extend in the optical axis direction, and
    each of the first axis of the projections in the part of the first region is inclined outwardly relative to the optical axis.

4. An imaging apparatus comprising the optical element of claim 1.

5. The optical element of claim 1, wherein each of the second axis of the projections in the part of the second region extends parallel to the optical axis of the optical element.

6. A method of manufacturing an optical element including projections arranged on a surface at a pitch smaller than or equal to a predetermined value to reduce reflection of light with a wavelength equal to or greater than the pitch and an optical axis of the optical element passing through the surface, the method comprising:
    preparing a mold provided with recesses corresponding to the projections, the recesses in the first mold region each having a first axis and the recesses in the second mold region each having a second axis;
    injecting a melted molding material into a cavity of the mold via a gate; and
    solidifying the molding material in the mold, wherein:
        the mold includes at least a first mold region and a second mold region,
        the first mold region is located between the gate and the second mold region,
        at least a part of the first mold region and a part of the second mold region has the same distance from the optical axis, and
        each of the first axis of the recesses in the part of the first mold region is inclined more outwardly relative to the optical axis of the optical element than each of the second axis of the recesses in the part of the second mold region.

7. The method of claim 6, wherein:
    each of the second axis of the recesses in the part of the second mold region extend in an optical axis direction, and
    each of the first axis of the recesses in the part of the first mold region are inclined outwardly relative to the optical axis.

8. The method of claim 6, wherein:
    the recesses are formed in a portion of the mold corresponding to the surface of the optical element,
    the gate is formed in a portion of the mold corresponding to an outer periphery of the optical element,
    the first mold region and the second mold region are formed in a portion of the mold corresponding to a peripheral portion of the surface of the optical element, and
    the first mold region is formed in a portion whose circumferential position corresponds to the gate.

9. The method of claim 6, wherein each of the second axis of the recesses in the part of the second mold region extends parallel to the optical axis of the optical element.

* * * * *